Oct. 31, 1961 J. SCHULZE ET AL 3,006,548

ELECTRONIC MULTIPLYING ARRANGEMENTS

Filed July 5, 1957 4 Sheets-Sheet 1

INVENTOR.

BY Joachim Schulze
Erdmann Hess

Oct. 31, 1961 J. SCHULZE ET AL 3,006,548

ELECTRONIC MULTIPLYING ARRANGEMENTS

Filed July 5, 1957 4 Sheets-Sheet 2

INVENTOR.

BY Joachim Schulze
Erdmann Hess

ELECTRONIC MULTIPLYING ARRANGEMENTS

Filed July 5, 1957 4 Sheets-Sheet 3

INVENTOR.

BY Joachim Schulze
Erdmann Hess

ELECTRONIC MULTIPLYING ARRANGEMENTS

Filed July 5, 1957 4 Sheets-Sheet 4

INVENTOR.
Joachim Schulze
BY Erdmann Hess 3,006,548
Patented Oct. 31, 1961

3,006,548

ELECTRONIC MULTIPLYING ARRANGEMENTS

Joachim Schulze and Erdmann Hess, Limbach-Oberfrohna, Germany, assignors to VEB Buchungsmaschinenwerk Karl-Marx-Stadt, Karl-Marx-Stadt, Germany Filed July 5, 1957, Ser. No. 670,011
Claims priority, application Germany Jan. 11, 1957
3 Claims. (Cl. 235—160)

Figure 1:
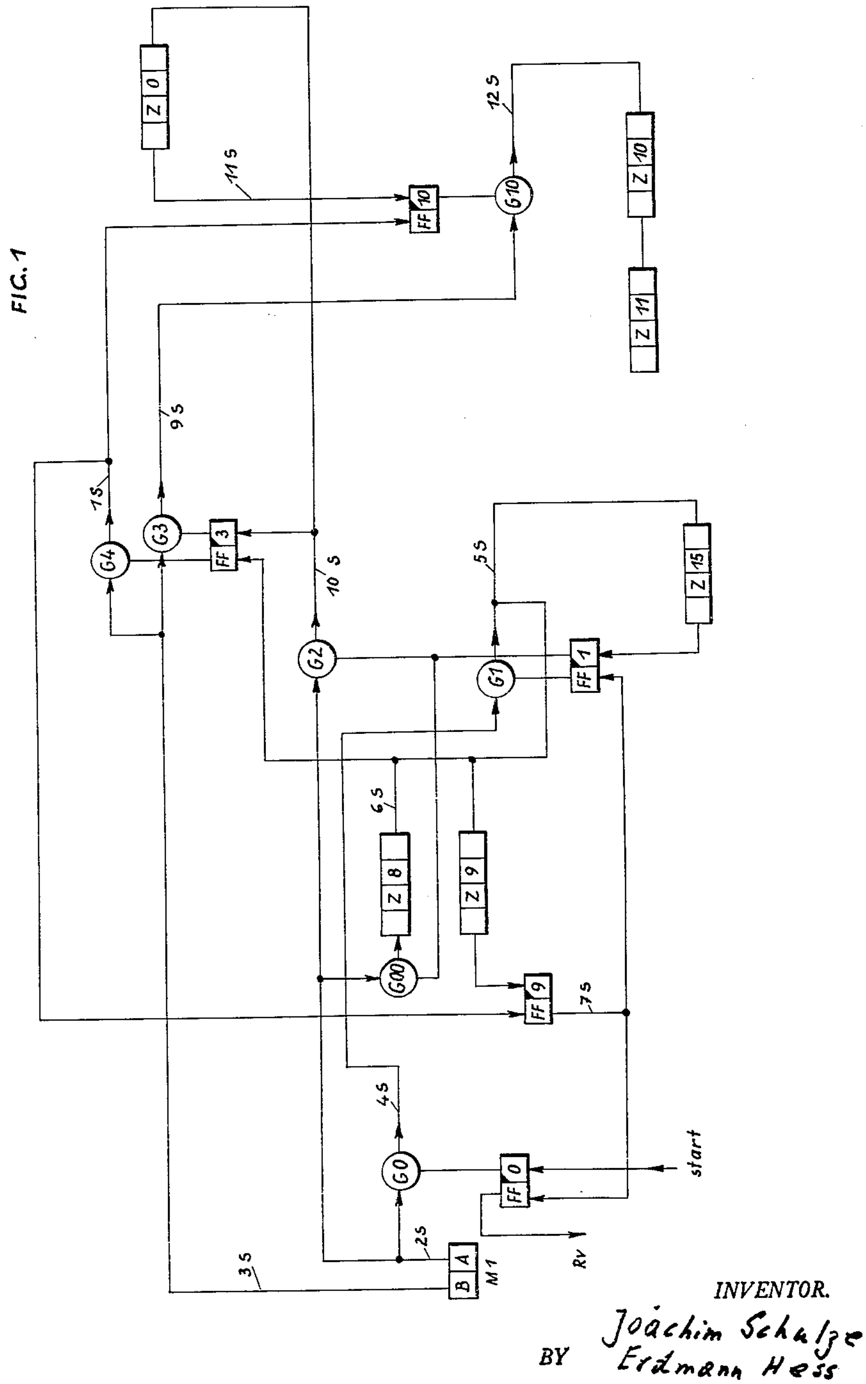

This invention relates to an electronic arrangement for performing multiplications by continuous addition, which comprises a pulse generator, decadic counting units capable of being stepped up by pulses and serving for taking up multiplicand, multiplier and product, and switching members consisting of bistable trigger circuits and gates.

Known arrangements of this kind possess two control counters by means of which the operating cycles for repeated transfer of the multiplicand to the product accumulator are controlled while the multiplier is being felt out. Successive stepping up of these control counters causes repetition of the operating cycles until the multiplicand has been entered in the product accumulator as many times as indicated by the multiplier. This is effected by pulses of a generator, which enter the first control counter and step it up, whereupon pulses are given off which over triggers and gates enter one of the decadic multiplier counters and a second control counter and advance them one step and which also actuate a counting-off device for product pulses. When the decimal numbering system is used, a series of nine product pulses counted off during each traversal of the first control counter remains ineffective until a sufficient number of pulses from the first control counter has entered the multiplier counter, set it to zero and thus gives off a transfer pulse which initiates the repeated transfer of the multiplicand to the product counter. Simultaneously, the second control counter has been switched to the tens complementary number of the multiplier, each switching step requiring a number of pulses corresponding to the counting capacity of the first control counter. Multiplication is then performed by the following operating cycles in such manner that at each revolution of the first control counter the multiplicand is transferred, and the number of transfers is determined by the second control counter. After this number has been transferred, multiplication is completed by the transfer pulse of the second control counter.

In other known types of electronic multiplying devices the cycles for the transfer of the multiplicand to the product counter are controlled by the multiplier taking up appliance. The successive step-by-step switching of this appliance comprising in this instance ten trigger circuits with associated contact members causes repetition of transfers according to the multiplier after the digital counting point of the multiplier number has been reached.

The arrangements just described are open to the objection that each decimal multiplication of the multiplicand by a multiplier digit requires a time corresponding to hundred pulses. When multiplications are to be performed by multipliers having more than one digit it is desirable to reduce the duration of a multiplication to the lowest possible point. It is the object of the invention to shorten the multiplication cycle by commencing counting off groups of pulses for transferring the multiplicand to the product counter only after a number of feeling-out or sensing pulses corresponding to the tens complement of the multiplier have entered from a multivibrator a multiplier counter over one or more gates.

Two examples of construction of the arrangement according to the invention are illustrated in the accompanying drawings and described in the specification.

Figure 2:
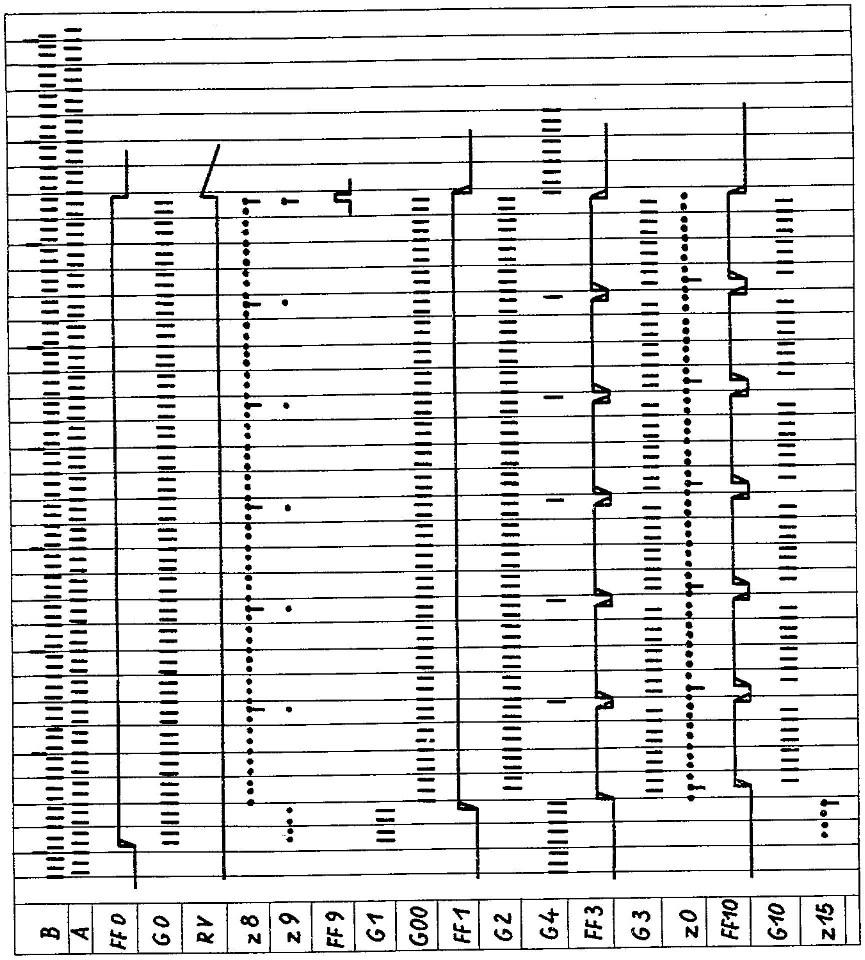
Figure 3:
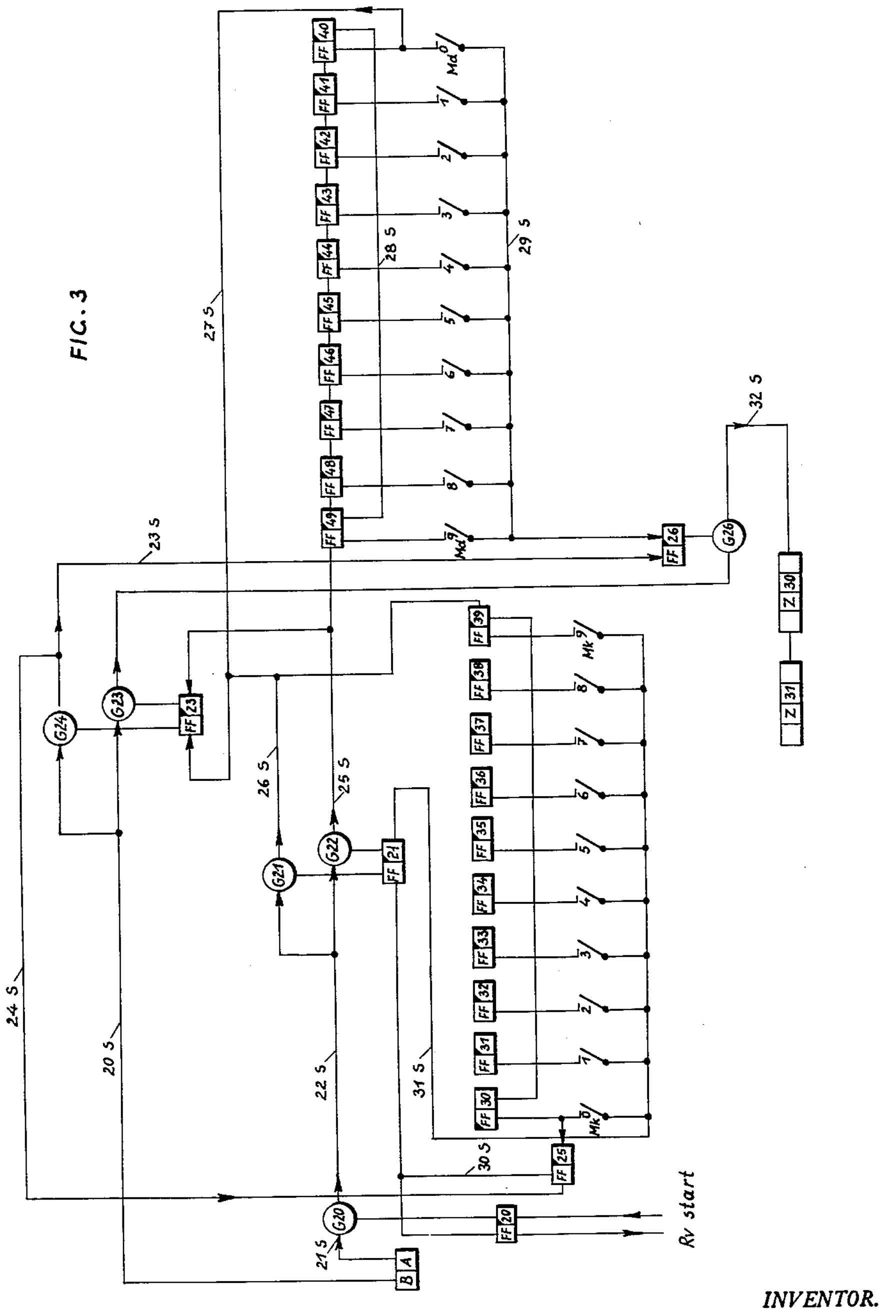
Figure 4:
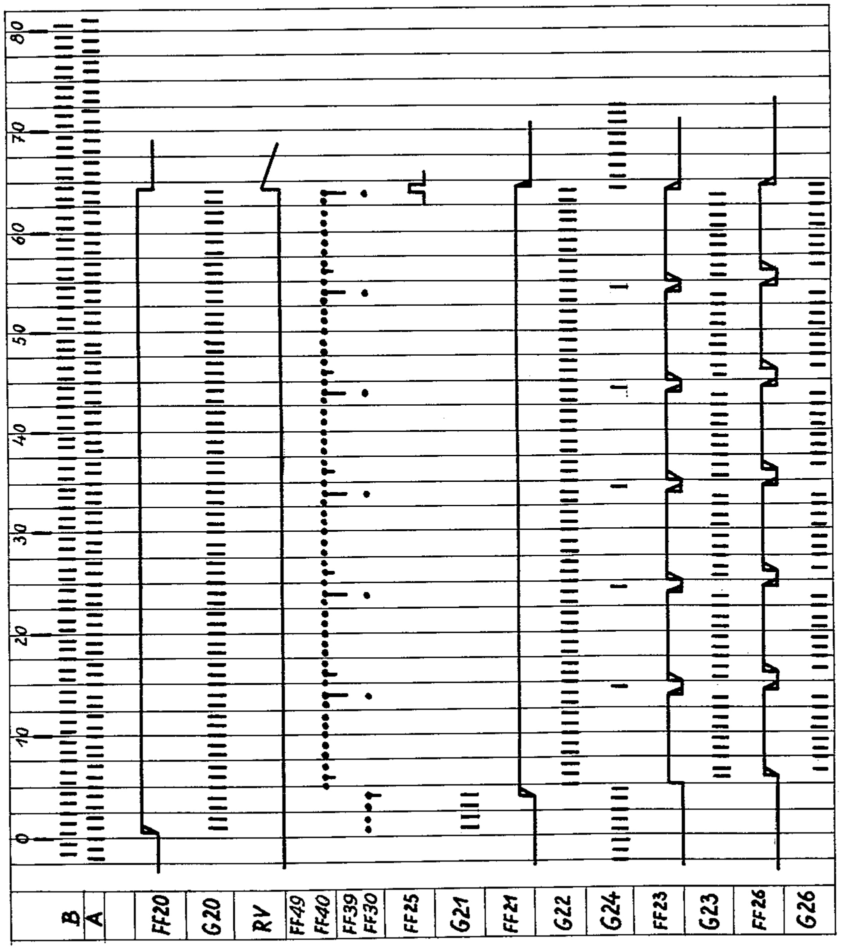

In the drawings:

FIGURE 1 is a block diagram of an arrangement, in which multiplication is controlled by two control counters;

FIG. 2, a pulse diagram for an example of application of the arrangement of FIG. 1;

FIG. 3, a block diagram of an arrangement, in which multiplication is controlled by the multiplier and multiplicand take-up appliance; and FIG. 4, a pulse diagram for an example of application of the arrangement of FIG. 3.

The arrangements shown are intended for performing multiplications within the decimal system, though the invention is not restricted to this system.

The switching elements in FIGS. 1 and 3 are shown without details which are not important for the mode of operation, as heating, positive and negative voltage paths, amplifiers; these have been omitted for better elucidation of the arrangement. Circuits of this type are illustrated in "Electron Tube Circuits" by Seely, McGraw-Hill Publishing Co., and referred to below.

In the examples given triodes of the usual type are used as gates (FIG. 19–1, 2, 3, Seely, above). A tube of this kind possesses a negatively biased grid. If the negative bias is so great that positive pulses passing to the grid do not render the tubes conductive, the passage of the pulses through the tube is blocked. A tube in such a condition is designated a "closed gate." If the negative bias is reduced by a positive constant pulse to an extent that positive pulses will increase the grid potential to the positive range, the tube carries current by pulses. The changes in potential occurring therein at its plate or cathode are used as pulses for switching elements, for instance counters or triggers. A tube in such condition is designated as "open gate."

The triggers used in the examples are conventional bistable electronic switches built up according to the known Eccles-Jordan connection (FIG. 19–15, Seely above) in which always one of the two tube systems carries current and switching is effected by pulses passed to the grids of the two tube systems. From the plates of the two tube systems positive or negative constant pulses are taken off, for instance for opening gates. The switching position occupied while at rest is designated "off-position," and the right-hand tube system is conductive. In FIGS. 1 and 3 the conductive condition is indicated by a triangle in the right- or the left-hand part of a rectangle representing a trigger. If for instance a negative pulse passes to the grid of the system conducting in resting position, i.e. the right-hand system, the trigger will tilt to the left into "on" position or condition; all other negative pulses on this grid remain ineffective. Only after a negative pulse passes to the grid of the left-hand system will the trigger tilt back into "off" position.

The counters Z0, 8, 9, 10, 11, 15 (FIG. 1) and Z30, 31 (FIG. 3) are binary counting tube connections of known kind consisting of four trigger circuits with a counting capacity of ten (FIG. 19–20, Seely, above). Counting by these counters called also Eccles-Jordan counting circuits takes place by joining the four triggers in series in binary manner so that the first pulse entering the counter switches the first trigger to "on," the second pulse switches it to "off" and the second trigger to "on"; the third pulse entering the counter switches the first trigger again to "on," and the fourth pulse switches the first two triggers to "off" and the third to "on," and so forth. The tenth pulse entering the counter when switching off the fourth trigger releases a transfer pulse at the outlet of the counter while simultaneously the first trigger set to "on" is switched off over a return circuit.

*First example of construction*

A pulse generator consisting of a double triode and designed according to the known multivibrator connection is hereafter designated multivibrator M1 and emits electric pulses over the leads 2S and 3S. The A-pulses derived from tube system A over lead 2S occur at a point of time between the B-pulses derived from tube system B over leads 3S, as indicated in FIG. 2. Lead 2S runs to two gates G0 and G2 which are both closed. Lead 3S runs to two gates G3 and G4 of which gate G3 is closed and gate G4 opened so that the B-pulses passing over lead 3S pass through gate G4 over lead 1S to the disconnecting inlets of two triggers FF9 and FF10. The pulses coming from gate G0 pass over a lead 4S through a gate G1 and over lead 5S to a multiplier counter Z15 which by its transfer pulse switches a trigger FF1 to "on" position, whereby gates G1, G2 and G00 are actuated. A-pulses passing through gate G2 are guided over a lead 10S to a multiple card counter Z0 whose transfer pulse passes over lead 11S to the connecting inlet of trigger FF10. When this trigger FF10 is switched to "on"-condition, a gate G10 is opened, whereby over the lead 12S product pulses from the pulse outlet of gate G10 can enter a product counter Z10. The product take-up or receiving device is an accumulative store or register, and the counters Z10 and Z11 are joined in series so that a transfer pulse of counter Z10 steps up counter Z11 and thus addition of all pulses entering counter Z10 takes place. From gates G2 A-pulses pass over lead 10S to the connecting inlet of a trigger FF3 which actuates gates G3 and G4. The pulse outlet lead of a gate G00 connects with a control counter Z8 the transfer pulses of which enter over lead 6S firstly the multiplier counter Z15 and step it up, secondly pass to the connecting inlet of a trigger FF3 and switch it to "on" and thirdly enter a second control counter Z9 and step it up. The transfer pulses of the control counter Z9 are guided to the connecting inlet of trigger FF9 which on being switched to "off" position gives off a pulse over lead 7S to the disconnecting inlet of trigger FF1 and to that of another trigger FF0.

The mode of operation will now be described by referring to a typical design:

Assumed the multiplicand counter Z0 contains the value 8 and the multiplier counter Z15 the value 6. At the commencement of the calculation trigger FF0 is switched by a starting pulse and opens therefore the gate G0 through which now A-pulses coming from the multivibrator pass over gate G1 into the multiplier counter Z15 and into control counter Z9. The first of these pulses switches the multiplier counter Z15, which in the example assumed is set to 6, to 7 and the control counter Z9, set to 0 in resting position, to 1. The second and third pulse passing through gate G1 performs the same switching functions so that the multiplier counter Z15 is switched to 9 and control counter Z9 to 3. The fourth pulse emerging from gate G1 switches the control counter Z9 to 4 and the multiplier counter Z15 to 10 or 0 while at its outlet a transfer pulse is released which switches trigger FF1 whereby gates G2 and G00 are opened and gate G1 is closed. The fifth A-pulse coming now from the multivibrator passes through gate G00 into the control counter Z8, which in resting position is set to 0, and switches it to 1. Simultaneously this pulse passes through gate G2 and switches trigger FF3 so that gate G3 is opened and gate G4 closed. Furthermore, the pulse leaving gate G2 passes over lead 10S into the multiplicand counter Z0 which was set to 8 and is switched to 9. The B-pulses issuing therefrom after opening of gate G3 pass through lead 9S to the closed gate G10 where they remain ineffective. The sixth A-pulse in similar manner switches control counter Z8 to 2 and the multiplicand counter Z0 to 10 or 0, whereby from the outlet thereof a transfer pulse passes over lead 11S to trigger FF10 and switches it to "on" position so that gate G10 is opened.

The following B-pulses pass through the now opened gate G10 into counter Z10 of the product register which like counter Z11 is in resting position set to 0. By the 7th to 13th A-pulses coming from the multivibrator no other switching functions are performed except stepping up of the control counter Z8 and multiplicand counter Z0. The 14th A-pulse switches control counter Z8 to 10, and the transfer pulse appearing at the outlet of the counter switches trigger FF3 to "off" position, whereby gate G3 is closed again and gate G4 opened. This interrupts the entry of the B-pulses into counter Z10, and the next pulse leaving gate G4 cuts out the trigger FF10 over lead 1S so that also gate G10 is closed again.

Through the gate G3 opened during the passage of the control counter Z8 nine B-pulses have come to gate G10 in the period between the 5th and 14th A-pulse (FIG. 2), eight of which, let through gate G10, entered counter Z10 which is now set to 8. This process is repeated at each passage of control counter Z8 while each 10th B-pulse during these multiplicand transfer cycles currently, by gate G4, prepares the blocking members, trigger FF10 and gate G10 for the new passage (FIG. 2).

The transfer pulse of the control counter Z8, released by the 14th A-pulse, switches the control counter Z9 to 5 and the multiplier counter Z15 to 1. From the 15th to the 64th pulse leaving the multivibrator M1 the process described with respect to the 5th to the 14th A-pulse is repeated five times while during each passage of the control counter Z8 eight B-pulses enter the counter Z10 of the product accumulator so that up to the 64th A-pulse a total of six series of eight B-pulses each have entered counter Z10.

By the 64th A-pulse, the sixth transfer pulse is released in the control counter Z8, which as 10th pulse enters the control counter Z9 and switches it to 0, whereupon the transfer pulse given off by control counter Z9 switches trigger FF9. The B-pulse produced by multivibrator M1 after the 64th A-pulse passes over gate G4 first to trigger FF10 and switches it to "off" position so that gate G10 is closed and then passes to trigger FF9 which is also switched to "off" position and gives off a pulse to triggers FF0 and FF1. Both triggers are thus switched to "off" position so that gate G2 is closed again by trigger FF1 and gate G1 opened and gate G0 closed by trigger FF0. At the same time the trigger FF0 gives off a control pulse which indicates the completion of the multiplication and initiates further operations.

Thus the multiplication is finished and the initial position restored, since the control counters Z8 and Z9 are set again to 0, the multiplicand counter Z8 is set to 8 and the multiplier counter Z15 to 6. The product accumulator contains the value 48, the counter Z10 being set to 8 and counter Z11 to 4 by four transfer pulses from counter Z10. In case of multiplications with multipliers having more than one digit the next calculating cycle may be begun with the same multiplicand by suitable switching of gate G1 and trigger FF1 to another multiplier.

*Second example of construction*

A multivibrator M2 (FIG. 3) of the same kind as that employed in the first example produces A-pulses and B-pulses and a B-pulse always occurs at a point of time between two A-pulses (FIG. 4). The A-pulses pass over a lead 21S to a closed gate G20, and the B-pulses are guided over a lead 20S to two gates G23 and G24 of which gate G23 is closed and gate G24 opened, so that on the outlet lead 23S of gate G24 B-pulses pass to the disconnecting inlet of a trigger FF26 which keeps a gate G26 closed. The B-pulses coming from gate G24 pass over a lead 24S to the disconnecting inlet of a trigger FF25. A lead 22S runs from gate G20 to two gates G21 and G22 which are controlled by a trigger FF21 and of which gate G21 is opened and gate G22 closed. A lead extends from the outlet of gate G22 to an electronic multiplicand counting device consisting of ten triggers FF40 to FF49 connected in series. The method of operation of such counting connections called also ring counters is known, and only the principle thereof will therefore be explained.

In position of rest the right-hand tube system of each trigger FF41 to FF49 carries current, and these triggers FF41 to FF49 are therefore in "off" position. Only in trigger FF40 is the left-hand tube system conductive, and this trigger is therefore in "on" position. The connecting inlets of triggers FF40 to FF49, which for example may be the positively biased cathodes of the right-hand tube systems, are interconnected and represent the pulse inlet of the counting connection. The plates of the left-hand tube systems are for instance also connected with the grid of the left-hand tube systems of the triggers FF49 to FF40, switched in counting direction, by pulse leads, and the last trigger FF40 is connected again with the first trigger FF49 of the ring counter. If a negative pulse enters the ring counter FF49 to FF40 over lead 25S, the cathode of the right-hand tube system of the trigger FF40 will become negative relative to the grid, and the right-hand tube system of this trigger FF40 begins to carry current so that the trigger tilts into "off" position. The left-hand tube system of this trigger FF40 is blocked thereby, and from the plate of this system a positive pulse is applied over lead 28S to the grid of the blocked left-hand tube system of the trigger FF49 which thus tilts into "on" position. The second pulse entering the ring counter Z49 to Z40 acts on the right-hand cathode of the trigger FF49, which is again the only one in "on" position, and switches it to "off" position, whereby the following trigger FF48 is switched to "on" position. In this way ten pulses enter the ring counter FF49 to FF40.

A multiplicand value is entered by means of contacts M*d*0 to M*d*9 connected in the plate conductors of the left-hand tube systems of triggers FF40 to FF49, the counting direction of the ring counter FF49 to FF40 being reciprocal to the order of values of contacts M*d*0 to M*d*9. If one of the contacts M*d*0 to M*d*9 is closed, for instance contact M*d*3, the trigger FF43 is switched to "on" position by the seventh pulse which has entered the ring counter FF49 to FF40 while from the left-hand plate of this trigger FF43 a pulse will be given over contact M*d*3 and lead 29S to the trigger FF26 for switching it to "on" position. The digital counting point to which a closed contact M*d*0 to M*d*9 is assigned is therefore reached after a number of pulses corresponding to the tens complement of the multiplicand value represented by the closed contact M*d*0 to M*d*9 has entered the ring counter FF40 to FF49. When ten pulses have entered the ring counter FF49 to FF40, a pulse passes from the last trigger FF40 of this counter over lead 27S to the inlet of a trigger FF23 which is switched thereby and actuates the two gates G23 and G24. Simultaneously this pulse passes from ring counter FF49 to FF40 into a ring counter FF39 to FF30 which in connection with the contacts M*k*0 to M*k*9 serves in the manner described for receiving the multiplier. From the outlet of gate G21 a lead 26S also extends to ring counter FF39 to FF30 so that this counter is stepped up as described by A-pulses from gate G21 and also by the pulses given off by trigger FF40 of the ring counter FF49 to FF40. After ten pulses have entered the ring counter FF39 to FF30, a pulse is given off from trigger FF30 to trigger FF25 which is switched to "on" position and on being switched to "off" position gives off pulses over lead 30S to two triggers FF20 and FF21. The pulses given off over contacts M*k*0 to M*k*9 during feeling out of the multiplier are guided over a lead 31S to the inlet of trigger FF21 which controls the passage of gates G21 and G22. From gate G26 a lead 32S extends to a product take-up device similar to that of the first example.

The mode of operation of this arrangement will now be explained by performing again the multiplication 6×8.

The multiplicand ring counter FF49 to FF40 contains the value 8, since contact M*d*8 is closed, and the multiplier ring counter FF39 to FF30 holds the value 6, due to the closing of contact M*k*6.

The trigger FF20 is switched by a starting pulse to "on" position whereby gate G20 is opened so that A-pulses coming from the multivibrator can enter the ring counter FF39 to FF30 over lead 22S through gate G21 and over lead 26S. The first A-pulse switches the ring counter FF39 to FF30 to 1 in the manner described, and trigger FF30 tilts into "off" position and trigger FF39 into "on" position. The second A-pulse switches the ring counter FF39 to FF30 to 2, i.e., trigger FF38 to "on" position and trigger FF39 to "off" position and so forth. At the same time the A-pulses coming from gate G21 are applied to trigger FF23 and remain there ineffective. The B-pulses produced by the multivibrator during this period pass through gate G24 and over leads 23S and 24S to the two triggers FF26 and FF25 and also remain ineffective. By the fourth A-pulse entering the ring counter FF39 to FF30 through gate G21 the trigger FF36 is switched to "on" position while over the closed contact M*k*6 and over lead 31S a pulse is given off to trigger FF21 which thus tilts into "on" position and thereby closes gate G21 and opens gate G22. The fifth A-pulse passes through gate G22 over lead 25S into the ring counter FF49 to FF40 and switches it to 1, trigger FF49 tilting into "on" position and trigger FF40 into "off" position. This pulse simultaneously switches trigger FF23 whereby gate G24 is closed and gate G23 opened. The now following B-pulse passing through gate G23 remains however ineffective at closed gate G26. By the sixth A-pulse the trigger FF49 in the ring counter FF49 to FF40 is switched to "off" position and trigger FF48 to "on" position while over the closed contact M*d*8 and lead 29S a pulse is given off to trigger FF26 which is switched thereby so that gate G26 is opened. The B-pulses following pass through gate G26 into the counter Z30 of the product take-up device and step it up. By the 7th to the 13th A-pulse coming from the multivibrator the ring counter FF49 to FF40 is stepped up, but no other switching functions are performed by them. With the 14th A-pulse the 10th pulse enters the ring counter FF49 to FF40, the trigger FF40 thereof is switched to "on" position and a pulse given off over lead 27S to trigger FF23 which is switched thereby so that gate G23 is closed and gate G24 opened. Entrance of the B-pulses into counter Z10 is thus interrupted, and the next pulse from gate G4 switches over lead 23S the trigger FF26 to "off" position whereby gate G26 is closed again.

Nine B-pulses have been applied to gate G26 (FIG. 4) through gate G23 opened during the passage of the ring counter FF49 to FF40 in the period between the 5th and 14th A-pulse, and eight of these nine pulses have entered through gate G26 counter Z30 which is now set to 8. This process is repeated at each passage of ring counter FF49 to FF40, and each 10th B-pulse in these multiplicand transfer cycles passing through gate G24 prepares the blocking members, trigger FF26 and gate G26 for the new traversal.

The pulse released with the 14th A-pulse in trigger FF40 of the ring counter FF49 to FF40 passes over lead 27S also into ring counter FF39 to FF30 and steps it up by switching trigger FF36 to "off" position and trigger FF35 to "on" position. From the 15th to the 64th pulse issuing from multivibrator M2 the process described with respect to the 5th to the 14th A-pulse is repeated five times, and during each passage of the ring counter FF49 to FF40 eight B-pulses enter the counter Z30 of the product take-up device. By the 64th A-pulse the sixth pulse is released in the trigger FF40 of the ring counter FF49 to FF40; it enters as 10th pulse the ring counter FF39 to FF30 and switches trigger FF31 to "off" position and trigger FF30 to "on" position whereupon the pulse given off by trigger FF30 switches trigger FF25. The B-pulse produced by the multivibrator after the 64th A-pulse passes first over lead 23S to trigger FF26 and actuates it in the manner described and passes then to trigger FF25 which is thereby switched to "off" position and gives off a pulse to triggers FF20 and FF21. Both triggers are thus switched to "off" position so that trigger FF21 closes gate G22 and opens gate G21 while trigger FF20 closes gate G20. Simultaneously trigger FF20 gives off an amplifying control pulse which indicates the completion of multiplication and serves for initiating further operations.

Thus the multiplication 6×8 is finished and the initial position restored. The ring counter FF49 to FF40 is in counting position 0, since trigger FF40 is in "on" position and all other triggers FF41 to FF49 are in "off" position. The ring counter FF39 to FF30 is also in counting position 0, because trigger FF30 is in "on" position and triggers FF31 to FF39 are in "off" position. The product accumulator contains the value 48, the counter Z10 being set to 8 and the counter Z11 by four transfer pulses from counter 10 set to 4. In case of multiplications with multipliers having more than one digit suitable switching of the trigger FF21 to another series of contacts containing the value of the next multiplier digit and being connected with the ring counter FF39 to FF30 as described will permit continuation of the calculating cycle of the next multiplier digit with the same multiplicand.

We claim:

1. In a multiplier having a multiplier receiving device of pre-selected digital capacity a first control circuit having a pre-selected digital capacity equal to the capacity of said multiplier receiving device, a first pulse source triggering said multiplier receiving device and said control circuit, re-cycle means in said multiplier receiving device and said control circuit, said multiplier receiving device being adapted to be preset to a chosen multiplier so that the re-cycling of said control circuit occurs after the recycling of said multiplier receiving device by a number of pulses equal to the chosen multiplier, a second source of pulses of frequency equal to the frequency of said first source of pulses and phased behind said first source of pulses, a product counter connected to said second source of pulses, a switch between said second source of pulses and said product counter, means turning on said switch upon re-cycling of said multiplier receiving device and turning off said switch upon re-cycling of said first control circuit, a multiplicand receiving device adapted to be preset, and a multiplicand control circuit adapted to be preset by the multiplicand receiving device to the complement of the chosen multiplicand for counting the number of re-cycles of said multiplier receiving device, and gate means serially connected with said switch and adapted to be permanently shut in response to recycling of said multiplicand control circuit whereby the number of re-cycles of multiplier receiving device is equal to the chosen multiplicand.

2. An electronic multiplying arrangement for numbers to a predetermined base comprising a first pulse source, a second pulse source associated with said first pulse source to provide pulses between the pulses of said first pulse source; pulse responsive, advanceable, recyclable multiplier counter means capable of being preset to a multiplier number for emitting a first pulse each time it receives a number of pulses sufficient to raise its setting to its cyclical capacity and for emitting a subsequent second pulse each time it receives a number of pulses after each first pulse equal to the multiplier number; pulse responsive, advanceable, re-cyclable multiplicand counter means capable of being preset to a multiplicand number for emitting a first pulse each time it receives a number of pulses sufficient to advance it to its cyclical capacity and for emitting a subsequent second pulse each time it receives a number of pulses after each first pulse equal to the multiplicand number; product register means, first circuit means connecting said first pulse source to said multiplicand counter means for advancing said multiplicand counter means, second circuit means connecting said second pulse source to said product register and including a first gate and a second gate serially connected between said second pulse source and said product register, means connecting said first gate to said multiplicand counter means for control thereby, means connecting said second gate to said multiplier counter for control thereby, said first gate being responsive to the first of the output pulses from said multiplicand counter means to be opened thereby, and responsive to the second of the output pulses from said multiplicand counter means to be closed thereby for advancing the product register during each interval between the first and second output pulse from the multiplicand counter means a number of positions equal to the multiplicand number, said second gate being responsive to the second output pulse from said multiplier counter means to disconnect the product register from said second pulse source, means connecting said multiplier counter means to receive pulses from said multiplicand counter means each time said multiplicand counter means emits a second pulse, third gate means connected between said multplicand counter means and said first pulse source adapted to be opened by the first pulse from said multiplier counter means, and means for re-cycling said multiplier counter means to start pulses from said first pulse source to said multiplicand counter, whereby upon said multiplier counter means receiving second pulses from said multiplicand counter means equal to the multiplier number set therein said multiplier means controls said second gate to permit a number of pulse packs equal to the multiplier number to enter into the product register.

3. A multiplier arrangement as in claim 2 wherein said multiplicand counter means and said multiplier counter means each includes a re-cyclable register counter and a re-cyclable control counter, each register counter being settable to a given number, and means for feeding pulses to each of said counters whereby each register counter recycles upon receiving a number of pulses equal to the complement of the number set therein and its associated control counter recycles upon receiving thereafter a number of pulses equal to the number set into the associated register counter.

References Cited in the file of this patent

UNITED STATES PATENTS

| | | |
|---|---|---|
| Re. 23,807 | Williams | Mar. 23, 1954 |
| 2,442,428 | Mumma | June 1, 1948 |
| 2,575,331 | Compton et al. | Nov. 20, 1951 |
| 2,624,507 | Phelps | Jan. 6, 1953 |
| 2,641,407 | Dickinson | June 9, 1953 |
| 2,802,625 | Dickinson | Aug. 13, 1957 |